United States Patent

[11] 3,576,444

| [72] | Inventor | Gordon A. Roberts<br>Ann Arbor, Mich. |
|---|---|---|
| [21] | Appl. No. | 785,811 |
| [22] | Filed | Nov. 29, 1968 |
| [45] | Patented | Apr. 27, 1971 |
| [73] | Assignee | Microdot, Inc.<br>New York, N.Y. |

[54] FLASHER
30 Claims, 13 Drawing Figs.

[52] U.S. Cl. ..................................... 307/106,
315/77, 315/209, 340/81
[51] Int. Cl. .................................... H03k 3/00
[50] Field of Search .............................. 307/132
(ER); 315/77, 209; 340/81, 83; 331/111

[56] References Cited
UNITED STATES PATENTS

| 3,204,146 | 8/1965 | Kratochuil.................... | 315/209 |
| 2,329,868 | 7/1967 | Domann et al. .............. | 315/77X |
| 3,413,519 | 11/1968 | Leeder, Jr. .................... | 307/132ER |
| 3,452,248 | 6/1969 | Leeder, Jr. .................... | 307/132ER |

*Primary Examiner*—Robert K. Schaefer
*Assistant Examiner*—H. J. Hohauser
*Attorney*—Harness, Dickey and Pierce ABSTRACT: A flasher circuit for use in controlling indicator and pilot lamps of a vehicle both in the turn signal and the emergency flash mode of operation wherein the flasher is utilized to control pulses of current to the lamp loads. The flasher may include lamp outage detection in both modes of flasher operation whether the same number of lamps are utilized or different numbers of lamps are utilized for each mode of operation.

INVENTOR.
Gordon A. Roberts
BY
Harness, Dickey & Pierce
ATTORNEYS

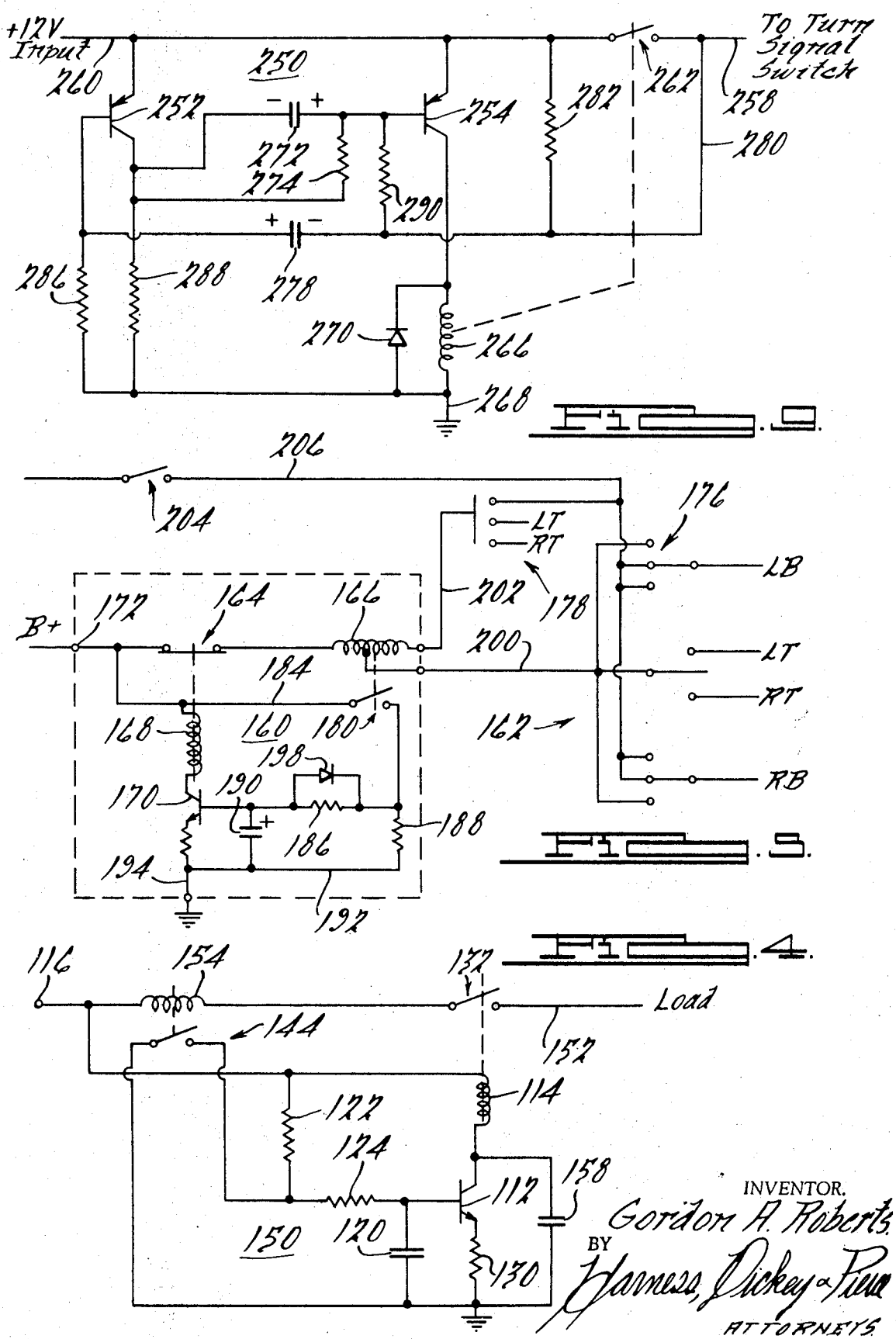

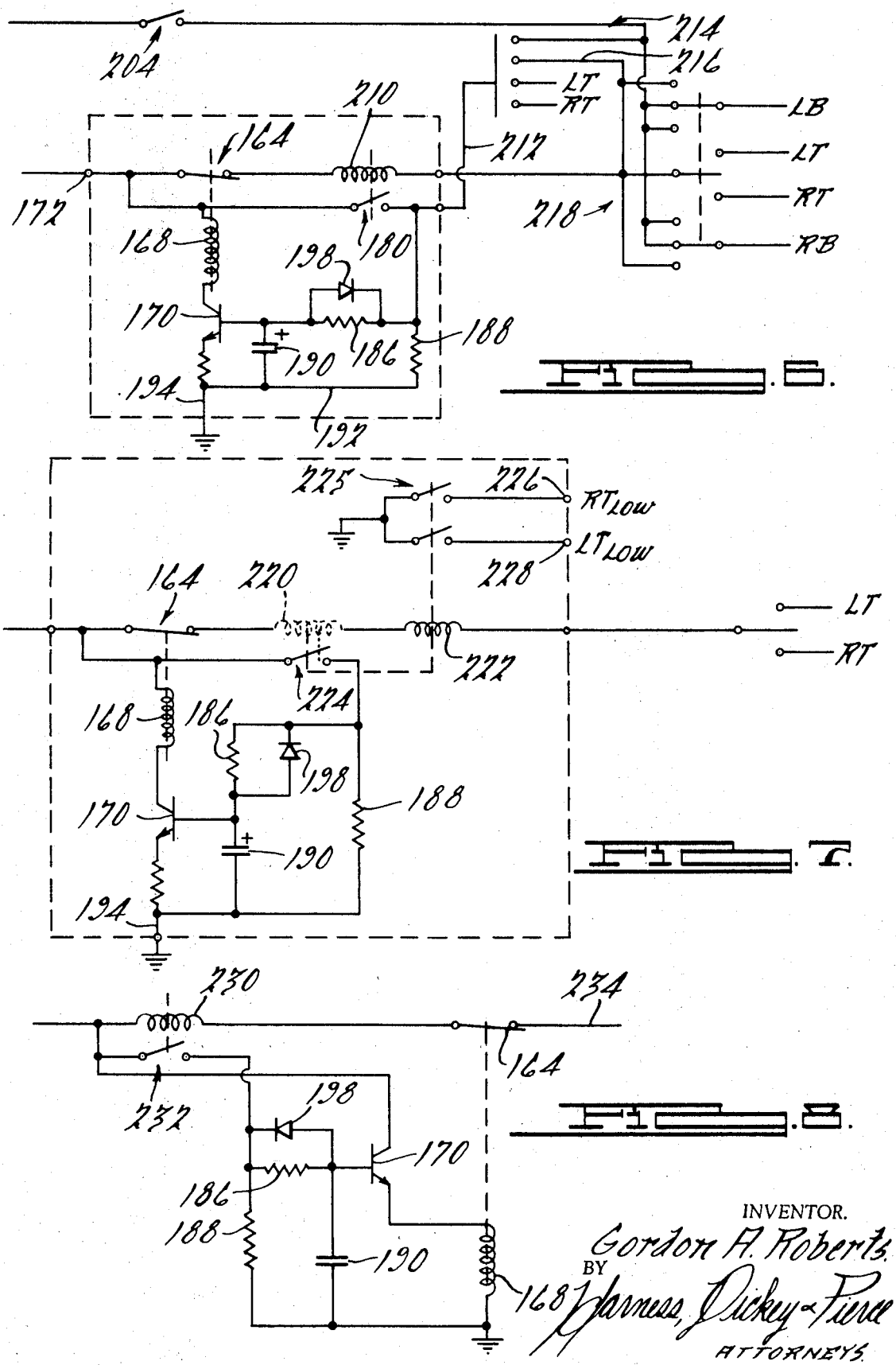

INVENTOR.
Gordon A. Roberts
BY
Harness, Dickey & Pierce
ATTORNEYS

INVENTOR.
Gordon A. Roberts
BY
Harness, Dickey & Pierce
ATTORNEYS

FLASHER

BACKGROUND AND SUMMARY OF THE INVENTION

This invention relates generally ton an improved pulse producing circuit and more specifically to an improved combination flasher for use in controlling turn signal and emergency four-way flash indicator and pilot lamps.

Flasher systems for automotive use are required to meet stringent specifications before they will be approved for automotive use. Many flasher circuits have been previously provided which have the requisite characteristics. However, in many instances, these flasher circuits are complex in construction, are slow to initially operate and require a duplication of parts to meet various flasher modes of operation. The systems of the present invention are calculated to improve flasher circuits available for automotive use and increase the reliability of the flasher.

Accordingly, it is one object of the present invention to provide an improved flasher circuit for use in controlling indicator lamps on a vehicle.

It is another object of the present invention to provide a flasher circuit having improved temperature stability.

It is still a further object of the present invention to provide a flasher circuit having improved voltage stability characteristics.

It is still another object of the present invention to provide an improved flasher circuit which utilizes the current pull-in and dropout characteristics of the relay as threshold points to determine the on and off time of the flasher circuit.

It is still a further object of the present invention to provide an improved flasher circuit which is capable of being closely regulated as to the ratio of on time to off time.

It is another object of the present invention to provide an improved combination flasher circuit which is capable of being utilized both for the turn signal and emergency flash modes of operation.

It is still another object of the present invention to provide an improved flasher circuit which is capable of inhibiting flashing upon the sensing of insufficient load current.

It is still a further object of the present invention to provide an improved normally closed electronic flasher circuit.

It is still another object of the present invention to provide an improved flasher circuit having low standby leakage current characteristics.

It is still a further object of the present invention to provide an improved flasher circuit having multiple threshold level lamp outage indicating characteristics.

It is still a further object of the present invention to provide an improved normally open flasher circuit for increasing the life of the turn signal switch.

It is still another object of the present invention to provide an improved flasher circuit having a relatively short initial off delay.

It is still another object of the present invention to provide an improved flasher circuit having on and off time characteristics which are independent of relay characteristics.

It is still a further object of the present invention to provide an improved flasher circuit having independent adjustment of the on and off times.

It is still another object of the present invention to provide inhibition of the flashing cycle in a flasher circuit when one or more lamps are detected as being open circuited, this feature being incorporated into a normally open flasher circuit.

It is still a further object of the present invention to provide an improved flasher circuit wherein the timing of the lamp outage signal does not influence the on time of the flasher in the situation where a load signal is sensed.

It is still a further object of the present invention to provide an improved flasher circuit having lamp outage indication feedback such that the feedback signal does not affect the on time interval.

Further objects, features and advantages of this invention will become apparent from a consideration of the following description, the appended claims and the accompanying drawings in which:

FIG. 4 is a schematic diagram illustrating a modified form of flasher incorporating certain other features of the present invention;

FIG. 5 is still another modified version of a flasher system incorporating certain features of the present invention;

FIG. 6 is another schematic diagram illustrating still a further modification of a flasher system;

FIG. 7 is another schematic diagram illustrating still a further modification of a flasher system;

FIG. 8 is another schematic diagram illustrating a further modification of a normally closed flasher system;

FIG. 9 is a schematic diagram illustrating one form of a normally open flasher circuit incorporating certain features of the present invention;

Figure 1:
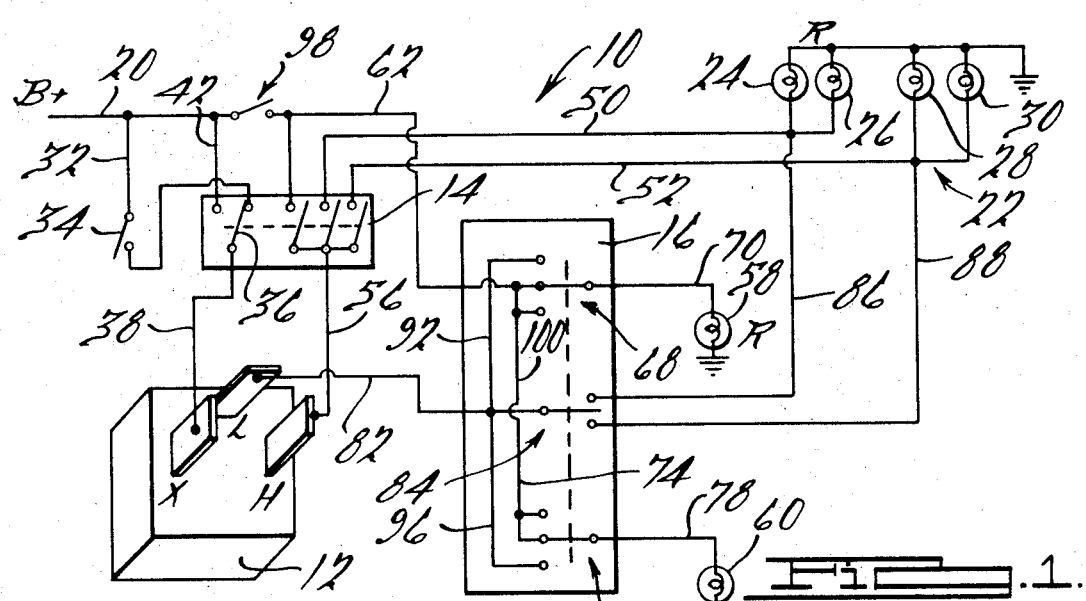
FIG. 1 is a schematic diagram illustrating a typical turn signal and emergency flash circuit which may be utilized in conjunction with the flasher system of the present invention.

Referring now to the drawings and particularly to FIG. 1, there is illustrated a flasher module 12, an emergency flash switch assembly 14 and a turn signal switch assembly 16. The system is fed from a source of direct current potential at input conductor 20, the source of potential 20 being utilized to energize a load system 22, including a plurality of individual lamps 24, 26, 28. The flow of electrical energy to the flasher module 12 is directed through a first conductor 32, an accessory switch 34, the armature of a switch 36 forming a portion of emergency flash switch 14 and conductor 38.

The flasher system 12 is also fed electrical energy from a conductor 42, the armature 36 and conductor 38 when the emergency flash switch 14 is moved to the left. Thus, the flasher is energized when the emergency four-way flash switch is in its normal position (not emergency flash) through the accessory switch 34 or directly from the conductor 42 when the system is in the emergency flash mode of operation. In this latter situation, the ignition switch or accessory switch may be off when it is desired to utilize the four-way flash operation.

The output of the flasher circuit 12 is fed through the right portion of the emergency flash switch 14, and thus energizes lamps 24, 26, 28 and 30, through conductors 50, 52, respectively. In the particular system illustrated, the lamp 24 is the right front lamp, lamp 26 the right indicator or pilot lamp, lamp 28 the left indicator or pilot lamp and lamp 30 the left front lamp. Energy pulses are also provided the right rear lamp 58 and the left rear lamp 60 through a conductor 62 and a portion of the turn signal switch 16. Particularly, the energy on conductor 62 is fed through the armature portion of switch 68 and conductor 70 to the lamp 58. Also, the pulses are fed from conductor 62 through a conductor 74, the armature portion of a switch 76 and conductor 78.

The turn signal circuit includes the L terminal from the flasher unit 12 which feeds a stream of output pulses to an output conductor 82, which is interconnected with the flasher switch assembly 16, when the system is in the flash mode. The switch assembly 16, in addition to the switches 68, 76, incorporates a third switch 84 which is adapted to feed the pulses of electrical energy to the front indicator and turn signal lamps by means of conductors 86, 88. Accordingly, when the armatures of switches 68, 84 and 76 are in the uppermost position, thus indicating a right turn, energy is fed from conductor 82 to the right rear indicator lamp 58 be means of a conductor 92, the armature of switch 68 and conductor 70.

Similarly, pulses of electrical energy are fed to the right front indicator or pilot lamp 26 and lamp 24 by means of conductor 82, the armature of switch 84 and conductor 86. On the other hand, when a left turn is desired to be signaled, the switch assembly 16 is moved to its lowermost position thereby interconnecting the input conductor 82 with conductor 88 through switch 84 to pulse lamps 28 and 30 and also to illuminate lamp 60 by means of a conductor 96, the armature of switch 76 and conductor 78. For purposes of the illustrated examples, it is to be understood that the H designated terminal indicates a high current load, and the L designated terminal indicates a low current load. These load current designations refer particularly to the lamp outage detection circuits to be hereinafter discussed.

Brake information is fed to the rear lamps 58 and 60 by means of a brake switch 98 which is directly connected at one end thereof to the source of electrical energy at terminal 20, and at the other end thereof to the turn signal switch assembly 16 by means of the conductor 62. Accordingly, when the switch 98 is closed by the brake system, a steady electrical current is fed to one or more of the rear lamps 58, 60 by means of conductor 62 and conductors 70, 74, 78, and specifically, with the switches 68, 76 in the position indicated, both lamps 58, 60 are illuminated through the armatures of switches 68, 76. If the turn signal switch assembly 16 is in the right turn mode of operation, the right rear lamp 58 will flash due to pulses of energy being fed thereto by means of conductors 82, 92 and switch 68, and the left rear lamp 60 will be continuously illuminated because of brake energy being fed thereto by means of conductor 62, a conductor 100 and switch 76.

Figure 2:
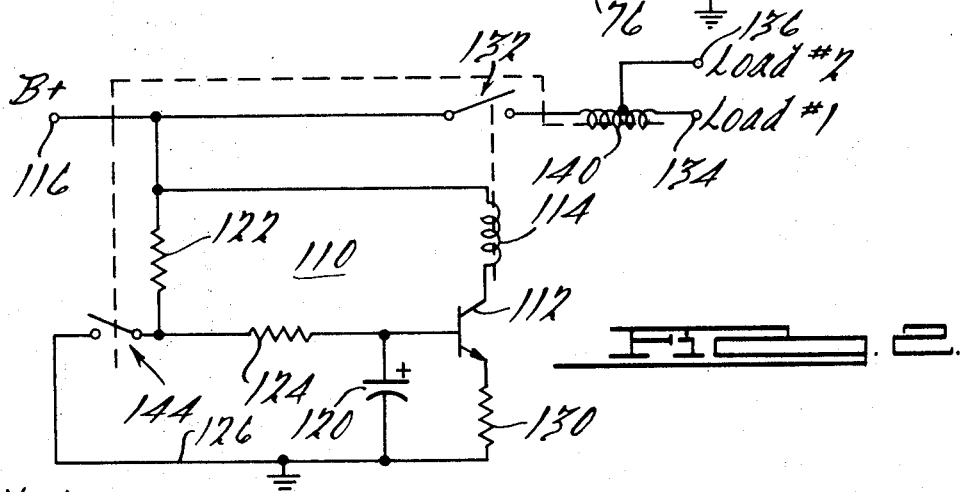
FIG. 2 is a schematic diagram illustrating certain features of the present invention.

Referring now to FIG. 2, there is illustrated one form of flasher circuit 110 which may be utilized in the flasher assembly 12 of FIG. 1. The flasher circuit includes a current controlling transistor 112 which is connected in controlling relation with a main relay coil 114, the coil 114 and transistor 112 being supplied with direct current electrical energy from an input terminal 116. The conductive condition of the transistor 112 is controlled by the charge on a capacitor 120, the capacitor 120 being charged through a circuit including a pair of series resistors 122, 124 connected between the input terminal 116 and the capacitor 120. The lower end of the capacitor 120 is grounded by means of a conductor 126.

Thus, with electrical energy applied to input terminal 116, the capacitor 120 is initially charged through the circuit including resistors 122 and 124 to a preselected level. This level is sufficient to drive transistor 112 to saturation thereby drawing current from the input terminal 116, through the coil 114, the transistor 112 and an emitter resistor 130. In this way, the coil 114 is energized relatively shortly after power is applied to terminal 116.

The energization of coil 114 closes a contact assembly 132 connected in series circuit between the input terminal 116 and a pair of output load terminals 134, 136. The output load terminals are directly connected to a load current sensing coil 140 which creates a flux in response to load current flowing in the coil 140. It is to be noted that the coil 140 is tapped by the conductor connected to output terminal 136 such that the left half of coil 140 is responsive to current flowing in both the load 1 and load 2 circuits and the right half of coil 140 is responsive only to current flowing in the load 1 circuit. In the embodiment illustrated in FIG. 1, the load 1 circuit is connected in the emergency flash mode of operation and the load 2 circuit is connected to the turn signal mode of operation.

From FIG. 1 it is to be noted that the two load circuits connected to terminals 134 and 136 are open circuited until such time as the turn signal switch or the emergency four-way flash switch is actuated. Accordingly, the relay coil 114 will remain energized and switch 132 closed until such time as one of the load circuits is connected to its respective load. When load current flows to the load circuit, the relay coil 140 will be energized and actuated if the load current is sufficient to pull the armature of the relay coil 140 to its operative state. With the relay coil 140 actuated, a switch 144 is closed to provide a discharge path through resistor 124, switch 144 and conductor 126 for the capacitor 120. When the voltage on the capacitor 120 drops below the level needed to maintain the relay coil 114 in the operative state, the relay 114 will drop out to open the switch 132. The opening of switch 132 stops the flow of current through the coil 140 to open the discharge path switch 144. Upon the opening of switch 144, the capacitor 120 will charge to a point where transistor 112 is sufficiently conductive to actuate relay contacts 132 through coil 114. The cycle will then repeat as long as a load circuit is connected to either terminal 134 of multivibrator type and the current drain is sufficient to actuate contacts 144 through the coil 140.

In this regard, it is to be noted from FIG. 1, that the terminal 134 is connected to the four-way switching circuit in which all of the front and rear lights are successively energized by the flasher circuit and in which flasher operation with at least two lamps is required. On the other hand, the terminal 136 is connected to either the right side or the left side lights depending on the particular turn signal mode selected.

With the switch 144 remaining open throughout the entire cycle, the capacitor 120 will not discharge and the pilot lights and the remaining lights in the system will be continuously energized to provide a lamp outage indication. It is to be further noted that the current through the relay circuit, including relay coil 114, is proportional to the voltage on the capacitor 120. Thus, the transistor 112 and resistor 130 act as a voltage to current transducer. Further, it is generally desirable that the voltage drop across resistor 130 be made relatively small as compared to the maximum voltage drop across the relay coil 114 to maintain a moderately good minimum supply voltage capability and yet hold down the transistor maximum collector current.

Figure 3:
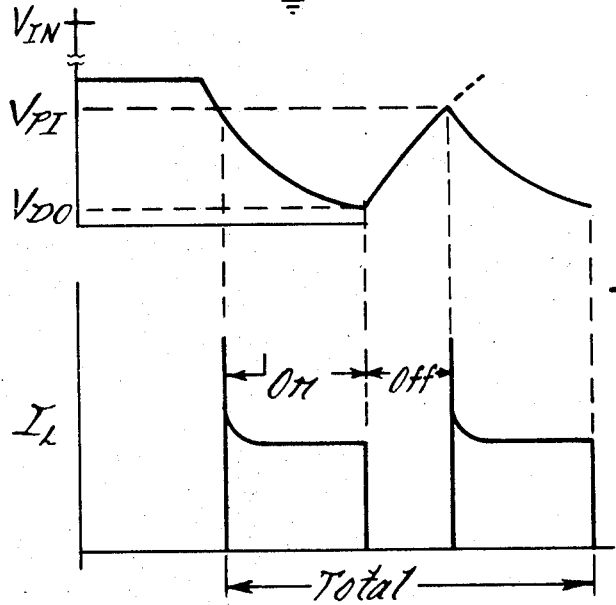
FIG. 3 is a voltage versus time and current versus time diagram illustrating the operating characteristics of the circuit of FIG. 2.

Referring now to FIG. 3, there is illustrated a voltage and current timing diagram illustrating the operation of the relay circuit and the load circuit through two cycles of operation of the flasher circuit. Accordingly, the input voltage is illustrated as being of a high level and is fed to the capacitor 120 until such time as the load current begins to flow. The charge on the capacitor 120 exponentially decays until such time as the dropout voltage of the relay coil 114 is reached. At this time, the capacitor commences charging again until such time as the pull-in voltage is reached. The off time of the flasher circuit is a function of the product of the magnitude of capacitor 120 and the sum of the resistors 122, 124, and the on time is a function of the product of the magnitude of resistor 124 and capacitor 120.

It is to be noted that the relay coil 140 provides two different lamp outage current levels. This system has been devised to meet the SAE specification that an emergency flash operation flasher must operate with as few as two lamps. In a vehicle that has only a single rear lamp on the side, the same threshold is required for turn signal and emergency flasher operation, and accordingly, would need only a single untapped coil 140. However, for two or three lamps per side at the rear, the turn signal threshold may be increased to a greater number of lamps than the emergency requirement. Thus in the case of a combination flasher, the two different threshold current levels are required.

FIG. 4 illustrates another modified form 150 of the flasher circuit wherein like elements have been given the same reference numeral. However, in the system of FIG. 4, a single load is being fed from a source at input terminal 116, the load being connected through the switch 132 and an output conductor 152. The discharge path is controlled, as was the case with FIG. 2, by the switch 144, the switch 144 being actuated by means of a single load circuit relay coil 154. Thus, as long as the output load current is sufficient to actuate the relay, including coil 154 and switch 144, the circuit 150 will cycle and cause the load to be flashed. The circuit of FIG. 4 has additionally been provided with a capacitor 158 connected in shunt relation with the transistor 112 and resistor 130 to reduce switching transients impressed on the transistor 112 due to the energization and deenergization of relay coil 114.

FIG. 5 illustrates a flasher circuit 160 of the normally closed type which is adapted to be utilized in conjunction with the system of FIG. 1. Specifically, the load circuit 162 is connected to the positive source of direct current energy through a normally closed switch 164 and a current sensitive relay 166. The switch 164 is controlled by means of a relay coil 168 which is, in turn, controlled by an NPN transistor 170. In the standby condition of the system 160 with the source of electrical energy applied at input terminal 172 and the switch 164 closed, the load circuit connected to the flasher 160 is immediately energized upon closing of the turn signal switch 176 or the emergency four-way flash switch 178.

Under these standby conditions, the relay coil 168 is deenergized and the transistor 170 is nonconductive due to the fact that a normally open switch 180, controlled by the coil 166, is opened until such time as load current flows in response to the closing of the turn signal switch 176 or the emergency four-way flash switch 178. Upon commencement of the flow of load current through the coil 166, either to the emergency flash switch 178 or the turn signal switch 176, the switch 180 will be closed to cause current to flow from the source of electrical energy at terminal 172 through a conductor 184, the switch 180, an RC timing circuit including a first resistor 186, a second resistor 188 and a capacitor 190, these latter elements being connected to ground to conductors 192, 194.

Accordingly, the capacitor 190 is charged through the resistor 186, the resistor 186 and capacitor 190 forming the on-time timing circuit for the flasher. At such time as the charge on capacitor 190 reaches a level to pull in the relay, including coil 168 and switch 164, the switch 164 is opened. The opening of switch 164 deenergizes the coil 166 to open the switch 180. With the switch 180 open, the capacitor discharges through a shunting diode 198 and the resistor 188, the diode directing current around the resistor 186. Thus, the off time for the flasher circuit 160 is determined by the magnitude of capacitor 190, the magnitude of the resistance of diode 198 and the resistor 188. The capacitor 190 will discharge until such time as the voltage on capacitor 190 lowers the conduction of transistor 170 to the point where the relay, including coil 168, drops out to close switch 164. Diode 198 may not be required if the sum of resistors 186 and 188 will produce the desired time period.

The turn signal switch 176 is fed with pulses from the flasher circuit through a conductor 200, the pulses being fed to the load lamps in a manner identical to that described in conjunction with FIG. 1. It is to be noted that the turn signal load is fed from the tapped portion of coil 166. The emergency flash switch 178 is fed from a second conductor 202 in a manner identical to that described in conjunction with FIG. 1. Also, braking information is supplied by a brake switch 204 which is interconnected with the brake lamps through a conductor 206 and the turn signal switch 176.

The current sensitive relay 166 is interconnected through the low current conductor 200 to the turn signal switch 176 when the system operates in the standard turn signal mode. If the emergency flash switch is shifted to the on condition, all of the turn signal lamps will be illuminated in response to the pulses supplied by the flasher circuit 160. In the particular system illustrated, the brake mode of operation overrides the emergency flash mode.

FIG. 6 illustrates a modification of the system of FIG. 5, wherein substantially all of the circuit is identical thereto with the exception that the emergency flash circuit is not provided with lamp outage detection. This is achieved by bypassing the lamp outage detection relay contact 180 with a conductor 212 feeding from an emergency four-way flash switch 214. The emergency flash switch assembly 214 is identical to that described in conjunction with FIG. 5 with the exception that an additional lead 216 is provided to send emergency flash information to the rear lights and LT and RT connected directly to the four-way flash switch 214. With the above noted exception, the turn signal switch 218 is also identical to that described in conjunction with FIG. 5.

FIG. 7 illustrates another modified form of the circuit of FIG. 5 in which the flasher portion of the circuit is substantially identical to that described in conjunction with FIGS. 5 and 6 wherein a coil 222 controls a switch 224 and additionally controls a lamp outage indicator switch 225. However, with this circuit the pull-in point of the two switches must be adjusted to provide proper operation. In order to avoid this adjustment, an additional coil 220 has been added and is connected in series with the coil 222 to provide lamp outage indication through the switch 224 with the switch 224 in the open position, thus indicating an insufficient load current. In this case, the coil 220 independently controls, indicated by the dotted line, the switch 224. The coil 222 is indicated as controlling the indicator lamp switch circuit 225 wherein the output terminals 226, 228 are connected to the pilot indicator lamps on the dashboard of the vehicle. If, the coil 220 is eliminated, the coil 222 is indicated, by dashed lines, as controlling both switches 224, 225. In the operation of the circuit of FIG. 7, the emergency flash circuit is permitted to run independently of any lamp outage indication in the event an emergency flash circuit is interconnected with the flasher of FIG. 7.

FIG. 8 illustrates a further modification of the circuit of FIG. 5 wherein the control transistor 170 is connected in an emitter follower configuration. Thus, the circuit, in its rest state, includes the normally closed switch 164 controlled by the relay coil 168, and a second coil 230 adapted to control a normally open set of contacts 232.

Thus, when current is drawn to the load connected to an output terminal 234, the coil 230 is energized to close switch 232 and start the charge cycle of capacitor 190 through resistor 186. When the charge on capacitor 190 reaches a level sufficient to pull in the relay, including coil 168, the switch 164 is opened. The opening of switch 164 deenergizes coil 230 to permit contacts 232 to open. With contacts 232 open, the capacitor 190 discharges through the diode 198 and resistor 188 and also a small amount of charge is discharged through the base emitter circuit of transistor 170. When the charge on capacitor 190, and thus the conduction of transistor 170, reaches such a low level that the coil 168 can no longer maintain the contacts 164 open, the contacts 164 will close to repeat the cycle.

FIG. 9 illustrates another form of flasher circuit 250 which may be utilized to provide pulses of electrical energy for energizing a turn signal indicator system. The circuit 250 includes a multivibrator-type of system including a normally conductive transistor 252 and a normally nonconductive transistor 254, these conditions occurring in the standby mode of operation. Electrical energy is fed to an output conductor 258 from an input conductor 260 connected to the source of a 12-volt direct current energy through a circuit controlling switch 262. The switch 262 forms a part of a relay assembly, the relay assembly including a coil 266 connected in the emitter-collector circuit of and controlled by the transistor 254. The lower end of the coil 266 is connected to ground potential by a conductor 268. A diode 270 is connected in shunt relation with the coil 266 to suppress transients created through the energization and deenergization of the coil 266. The diode 270 may be eliminated if transistor 254 can tolerate the transients from coil 266.

The base electrode of transistor 254 is coupled to the collector electrode of transistor 252 by means of a capacitor 272 and a resistor 274 and the base electrode of transistor 252 is coupled to the output conductor 258 by means of a second capacitor 278 and a conductor 280. The positive end of capacitor 278 is connected to ground potential and conductor 268 through a resistor 286 which also serves as a base driver resistor for the transistor 252. Further, the resistor 288 is connected between the collector electrode of transistor 252 and ground potential at conductor 268 to provide a collector load resistor for the transistor 252. Resistor 290 provides base drive to transistor 254 from resistor 282 or conductor 280. During the period that the switch 262 is open, the capacitor 278 and resistor 290 are connected to the source of electrical energy on conductor 260 by means of a resistor 282. The emitters of transistors 252, 254 are connected to line 260.

The operation of circuit 250 assumes initially that the conductor 260 is connected to a 12-volt source of direct current potential and the switch 262 is open circuited. Under these conditions, transistor 252 is conducting, transistor 254 is nonconducting and capacitors 272 and 278 are approximately at a zero initial voltage. Upon closing the turn signal switch connected to conductor 258, the switch 262 being open circuited, the output conductor 258 is dropped to very nearly ground potential due to the extremely low resistance of the lamp load. This ground potential supplies base drive to transistor 254 by means of conductors 280 and resistor 290 to render transistor 254 conductive. This initial turn-on of transistor 254 occurs with a slight delay due to the fact that the positive end of capacitor 272 is very nearly at the potential of conductor 260, and this potential must be changed by approximately 6/10 of a volt for the transistor 254 to be rendered conductive.

In the particular circuit being discussed, the resistors 274 and 290 and the magnitude of capacitor 272 will determine the amount of delay time which occurs before transistor 254 is rendered conductive. However, these circuit parameters are selected such that the delay is small as compared to the normal off delay when the flasher is sequencing, yet is long enough to preclude an inrush of load current into the turn signal switch. Thus, the turn signal switch will not be subjected to a high load current, thus arcing the switch contacts. Also, upon closing the turn signal switch connected to conductor 258, the capacitor 278 is charged to approximately the power supply input voltage.

Upon the lapse of the initial delay, the transistor 254 is rendered conductive to energize relay coil 266 and close contacts 262. Upon the closure of contacts 262, the output conductor 258 rises to the supply voltage at input conductor 260 to remove base drive to transistor 254 through resistor 290.

As noted above capacitor 278 has been charged to the supply voltage. When switch 262 closes this connects the negative end of capacitor 278 to the input line 260 which in turn raises the base voltage of transistor 252 to approximately twice the supply voltage. This reverse biases the base-emitter junction of transistor 252 and turns it off. Capacitor 272 has nearly zero charge just prior to the turn off of transistor 252. When transistor 252 turns off, this supplies base drive to transistor 254 by capacitor 272 for a short time and resistor 274 supplies a sustained drive. After a short time, the capacitor 272 will become charged to a voltage which is a fraction of the supply voltage. The value will be primarily a function of resistors 288 and 274. Typically it is a major fraction of the supply voltage. The time that transistor 252 r3mains remains off and transistor 254 on is primarily determined by the resistor 286 and capacitor 278. As base drive was lost to transistor 254 via resistor 290 it was resupplied from the output of transistor 252. In effect the two sources driving the base of transistor 254 are coupled to said base via an "or" circuit. For all practical purposes transistor 254 remains energized during these changes, as do relay contacts 262.

After capacitor 278 times out, 252 is rendered conductive and the charge (described above as a fraction of the supply voltage) on capacitor 272 back biases the emitter circuit of transistor 254 to render the transistor 254 nonconductive. The nonconductive state of transistor 254 cuts off the energizing current for relay coil 266 to open the contacts 262. The opening of contacts 262 again drops output conductor 258 to very nearly ground potential and the cycle is restarted. However, it is to be noted that the capacitor 272 is now charged to a substantial voltage, which voltage will increase the off time of the system. The initial delay time is very short and the running off time is longer, as determined by the charge on capacitor 272 and the resistors 274 and 290.

Figure 10:
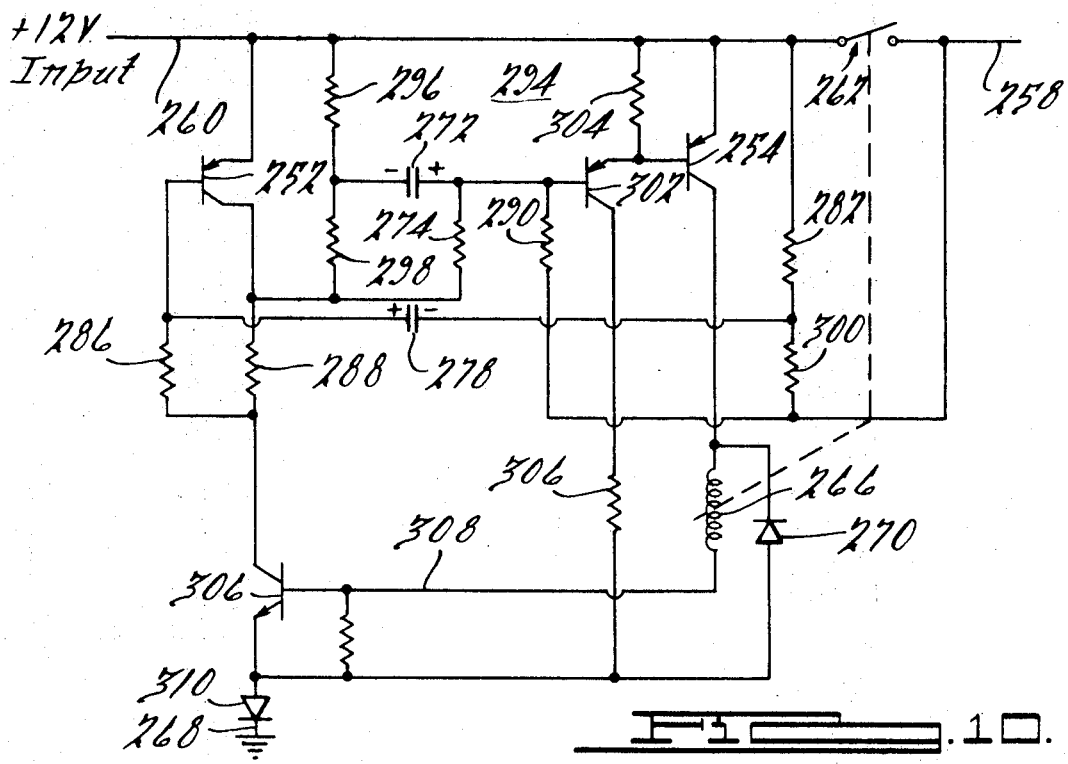
FIG. 10 is another schematic diagram illustrating a modification of the open circuit flasher system of FIG. 9.

Referring now to FIG. 10, there is illustrated a modified form of the flasher circuit of FIG. 9, wherein like elements have been given same reference numerals. In the circuit of FIG. 10, the capacitors 272 and 278 are provided with a reduced voltage through the provision of a voltage divider circuit. In the case of capacitor 272, the voltage divider circuit consists of a first resistor 296 and a second resistor 298 and the voltage divider circuit for capacitor 278 includes the resistor 282 and a second resistor 300. Also, a driver amplifier 302, including an emitter resistor 304 and a collector load resistor 306, has been added to provide additional driving current for the transistor 254 when the transistor 254 is to be turned on. However, it is to be noted that all of the transistors of the circuit, including transistors 252, 254, 302 and a switching transistor 306, are in the nonconductive state when the system is in the standby condition. Thus, the current drain for the circuit of FIG. 10 is extremely low.

The transistor 306 has been added in series circuit with the emitter-collector circuit of transistor 252, the base-emitter current for transistor 306 being provided by the energization of coil 266 and a conductor 308. After the circuit is operated in accordance with the description of FIG. 9, the transistor 254 is cut off thereby deenergizing the coil 266. However, the energy stored in coil 266 will maintain the conductive state of transistor 306 for a preselected short period after the transistor 254 is turned off. This delay in the turnoff of transistor 306 is provided to obviate the possibility of the flasher entering a buzzer-type mode of operation. A diode 310 is provided to protect the circuitry in the event that a negative 12-volt source of potential is applied at input conductor 260.

Figure 11:
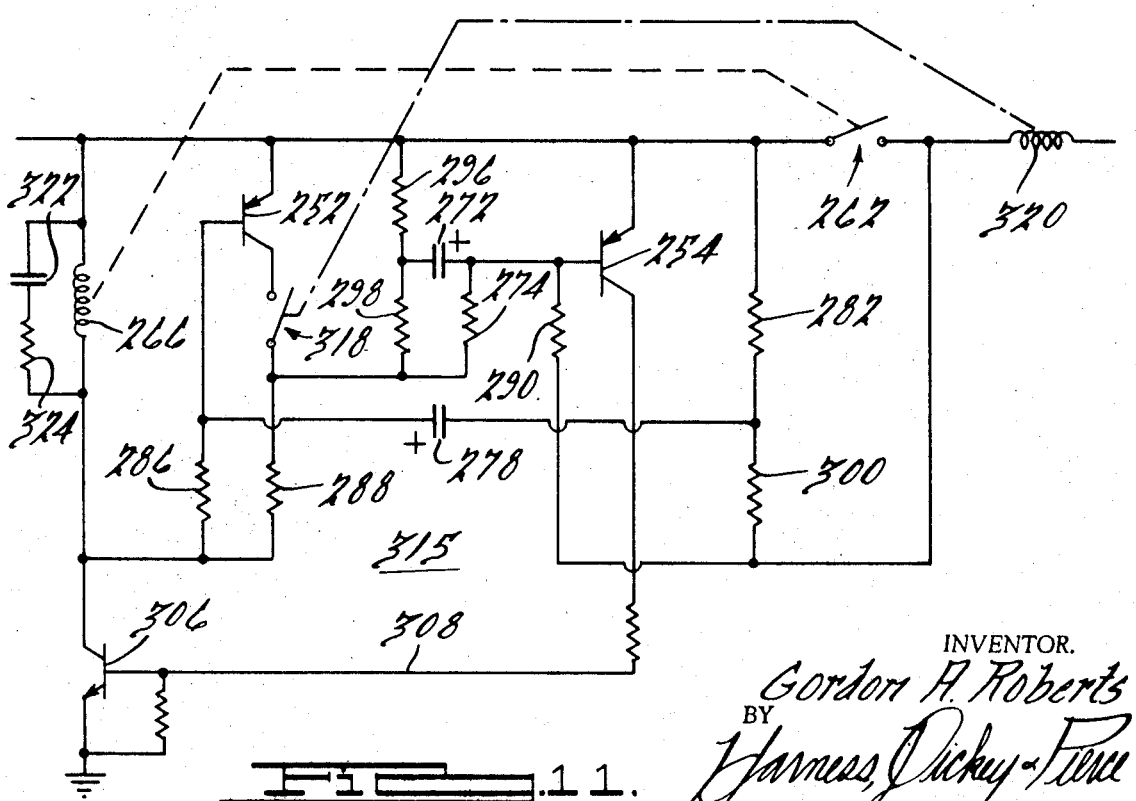
FIG. 11 is another schematic diagram illustrating still further modification of the flasher system of FIG. 9.

Referring now to FIG. 11, there is illustrated another modified form of the circuitry of FIG. 9, wherein the circuit 315 contains substantially all of the circuit elements of FIG. 10 with the exception that the driver transistor 302 has been eliminated and the transistor 254 is utilized solely to control the conduction of transistor 306 rather than additionally controlling the energization of the coil 266. Further, the conduction of transistor 252 is not directly controlled by the transistor 306 in that the collector circuit of transistor 252 is controlled by a switch 318. The transistor 306 is connected in circuit controlling relation with the coil 266 which is utilized to control the opening and closing action of switch 262. When the switch 262 is closed, an additional coil 320 is energized to close the normally open switch 318 connected in the collector circuit of transistor 252. Thus, a positive cutoff for the conduction of transistor 252 is provided. Further, the diode 270 connected in shunt relation with the coil 266 has been eliminated due to the fact that the diode, in the circuit of FIG. 11, does not generally provide sufficient time delay. In lieu of the diode, a capacitor 322 and resistor 324 have been connected across the coil 266 to absorb inductive kicks from inductor 266 and provide sufficient dropout delay during the transition of inputs to transistor 254. The resistor 324 may be omitted if transistor 306 is capable of handling the peak inrush currents of capacitor 322.

Figure 12:
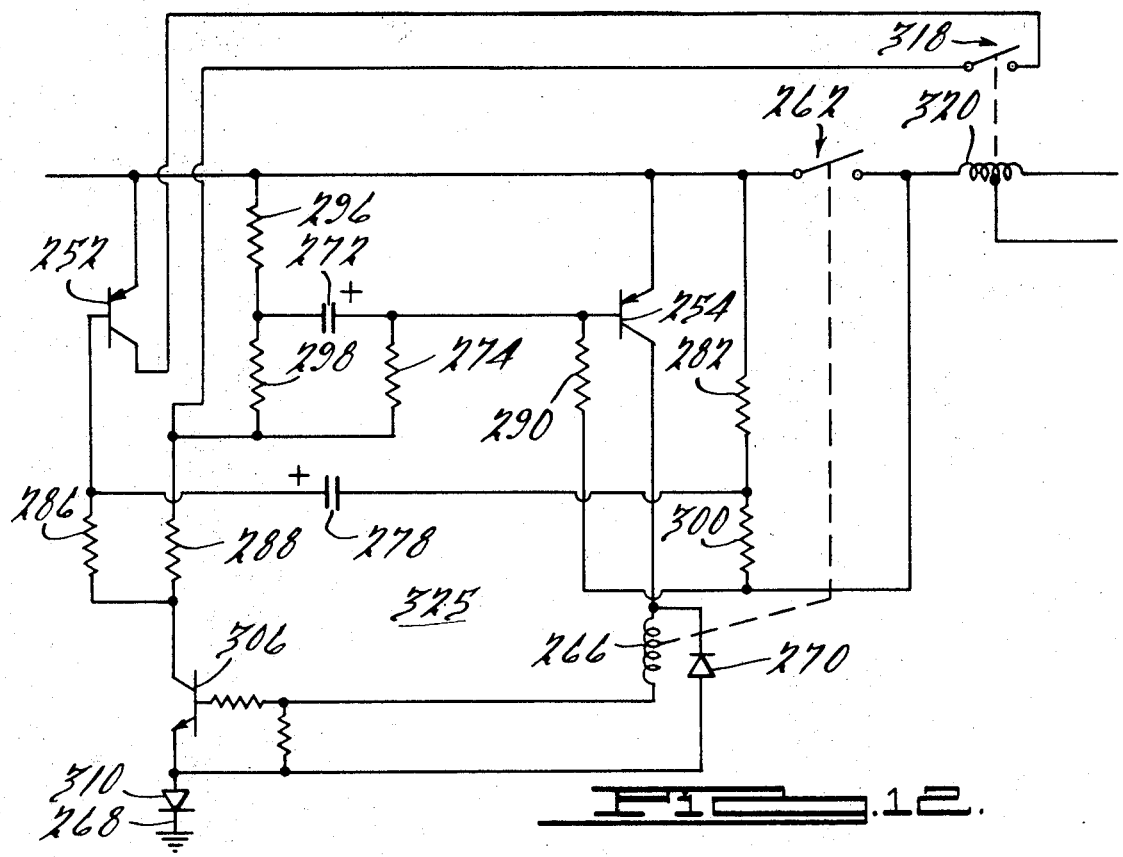
FIG. 12 is another schematic diagram illustrating still another modification of the open circuit flasher system of FIG. 9.

The circuit 325 of FIG. 12 is substantially identical to FIGS. 10 and 11 with the exception that the variations between FIGS. 10 and 11 have been combined in the circuit 325 of FIG. 12. For example, the main relay coil 266 is controlled by the conduction of transistor 254 and the conduction of transistor 306 is controlled through the energization of coil 266. As was the case with FIG. 10, the turnoff of transistor 306 is delayed slightly by means of the energy stored in coil 266. However, as was the case with FIG. 10, the turnoff of transistor 306 is delayed slightly by means of the energy stored in coil 266. However, as was the case with FIG. 11, an additional coil 320 is connected in series circuit with the switch 262, the coil 320 being adapted to control a switch 318 connected in series circuit with the collector circuit of transistor 252. Thus, a positive cutoff for the transistor 252 is provided when the load circuit is not being energized. Otherwise, the circuit 325 of FIG. 12 operates identically to the operation of flashers 294 and 315.

Figure 13:
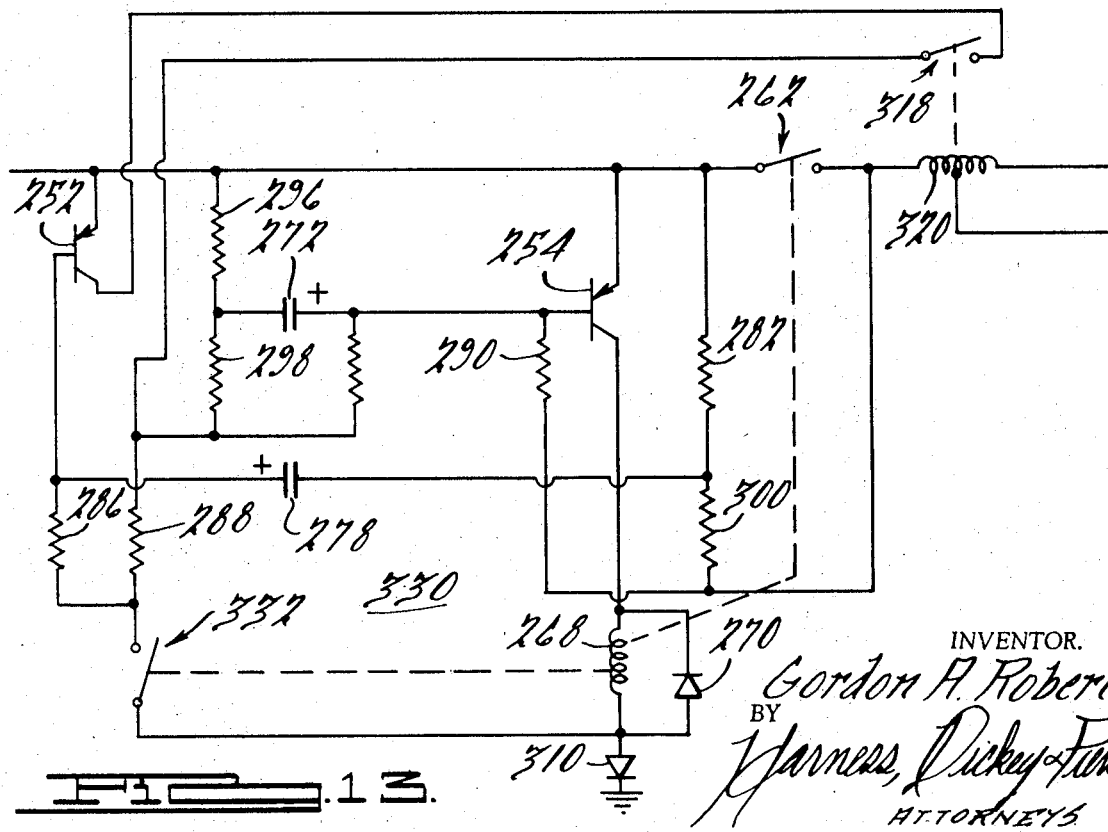
FIG. 13 is a further schematic diagram illustrating a further modification of the circuit of FIG. 9.

The circuit 330 of FIG. 13 is identical with that described in conjunction with FIG. 12 with that exception that the transistor 306 has been replaced by a switch 332. Thus, the circuit 330 of FIG. 13 operates identically to that described in conjunction with FIG. 12, with the exception that the coil 268 is adapted to operate the switch 332 mechanically through a relay armature rather than energizing a transistor. The delay in opening the circuit caused by the energy of the coil 266 being pumped through the transistor 306 in FIG. 12 is accomplished through the inherent mechanical delay or mechanical inertia of the relay including coil 268 and switch 332.

While it will be apparent that the embodiments of the invention herein disclosed are well calculated to fulfill the objects of the invention, it will be appreciated that the invention is susceptible to modification, variation and change without departing from the proper scope of fair meaning of the subjoined claims.

I claim:

1. A flasher circuit for pulsing a load circuit from a source of electrical energy comprising control circuit means interconnecting the source of electrical energy and the load circuit including switch means 132 having an open and closed position and current sensing means 140 connected in circuit with said switch means and the load circuit to sense a current flow in the connection between the source and the load circuit, and a timing circuit connected in controlling relation with said switch means for opening and closing said switch means in a preselected timed operation, said timing circuit having a capacitor 120, a charging circuit 122, 124 and a discharge circuit 124, 144, 126 for said capacitor, enabling circuit means for enabling one of said charge and discharge circuits in response to an electrical condition of said current sensing means and the current flow of the energy being fed to the load circuit, and switch control means connected in controlling relation with said switch means and operable to control the open and closed states of said switch means and the energization of said current sensing means in response to the charge level on said capacitor.

2. The invention of claim 1 wherein the pull-in and dropout characteristics of said relay are utilized to control said switch means.

3. The invention of claim switch means is initially closed at the start of said timed operation, and means for initially charging said capacitor when said switch means is closed.

4. The invention of claim 1 wherein said current sensing means includes a load current coil connected in series with the load circuit.

5. The invention of claim 4 wherein one of said charge and discharge circuits includes a second switch, said second switch being magnetically coupled with said load current coil and controlled thereby to open and close said second switch.

6. The invention of claim 5 wherein said load current coil is tapped to provide two output terminals, said second switch being opened and closed in response to different load currents depending on the output terminal being energized.

7. The invention of claim 1 wherein said switch control means includes a relay coil controlling said switch means and a semiconductor device controlling the energization of said relay coil.

8. The invention of claim 7 wherein the pull-in and dropout characteristics of said relay are utilized to control said switch means.

9. A flasher circuit for pulsing a load circuit from a source of electrical energy comprising control circuit means interconnecting the source of electrical energy and the load circuit including switch means having an open and closed position and current sensing means connected in circuit with said switch means, and a timing circuit connected in controlling relation with said switch means for opening and closing said switch means in a preselected timed operation, said timing circuit having a capacitor, a charging circuit and a discharge circuit for said capacitor, one of said charge and discharge circuits being enabled in response to an electrical condition of said current sensing means, and switch control means connected in controlling relation with said switch means and operable to control the open and closed states of said switch means and the energization of said current sensing means in response to the charge level on said capacitor, said switch control means including a relay coil controlling said switch means and a semiconductor device controlling the energization of said relay coil.

10. The invention of claim 9 wherein said timing circuit is initially connected to the source of supply to initially charge said capacitor and cause said semiconductor device to conduct and energize said coil.

11. The invention of claim 9 wherein said control circuit means includes a conductor, a pair of normally open contacts and a load current sensing coil connected in series between the source and the load circuit, and said relay coil is initially energized to close said contacts upon application of power to the flasher circuit, the flow of load current energizing said load current sensing coil and, enabling means connected in circuit with said discharge circuit, said enabling means being enabled in response to the energization of said load current sensing coil.

12. The invention of claim 11 wherein said charging circuit includes a resistor, a switching device being connected in said discharge circuit across said resistor to remove the effect of said resistor in response to the discharge of said capacitor.

13. The invention of claim 11 wherein said semiconductor device is connected in an emitter follower configuration relative to said relay coil.

14. The invention of claim 11 wherein said switch means is opened and closed in response to the pull-in and dropout characteristics of said relay.

15. The invention of claim 14 further including a capacitor connected across said semiconductor device and in series with said relay coil to protect said semiconductor device from transients.

16. In a flasher circuit for pulsing a load circuit from a source of electrical energy including control circuit means interconnecting the source of electrical energy and the load circuit including switch means having an open and closed position, and a timing circuit connected in controlling relation with said switch means for opening and closing said switch means in a preselected timed operation, the timing circuit comprising an output control circuit including a cross-coupling network, said network including a capacitor, said timing circuit including a charging circuit and a discharge circuit for said capacitor, said output control circuit including first timing means for establishing a first off delay time for the flasher circuit, an on delay and a second off delay, said first off delay being substantially shorter than said second off delay.

17. The invention of claim 16 wherein said output control circuit includes a normally conducting transistor and a normally nonconducting transistor, and a first capacitor connected between the base circuit of one of said transistors and emitter circuit of the other of said transistors, said capacitor initially having a substantially zero charge thereon when the load circuit is open circuited.

18. The invention of claim 17 wherein said first capacitor is one of the parameters which determines the first off delay time.

19. The invention of claim 18 wherein one end of said first capacitor is connected to the source of electrical energy and the other end is connected to ground potential upon the closing of the switch means.

20. the invention of claim 19 wherein said output control circuit further includes a second capacitor connected to said load circuit and the base electrodes of said transistors, said second capacitor being connected to time the end of the on time of the flasher.

21. In a flasher circuit for pulsing a load circuit from a source of electrical energy including control circuit means interconnecting the source of electrical energy and the load circuit including switch means having an open and closed position, and a timing circuit connected in controlling relation with said switch means for opening and closing said switch means in a preselected timed operation, the improvement comprising timing means in the timing circuit for establishing a first off delay time for the flasher circuit, an on delay and a second off delay, said first off delay being substantially shorter than said second off delay.

22. The improvement of claim 21 wherein said timing means includes a first capacitor, said capacitor initially having a substantially zero charge thereon when the load circuit is open circuited.

23. The improvement of claim 22 wherein said first capacitor is one of the parameters which determines the first off delay time.

24. The improvement of claim 23 wherein one end of said first capacitor is connected to the source of electrical energy and the other end is connected to ground potential upon the closing of the switch means, the initial charging of said first capacitor determining said first and said second off delay.

25. The improvement of claim 24 wherein said timing means further includes a second capacitor connected to the load circuit, said second capacitor is connected to time the end of the on time of the flasher.

26. The improvement of claim 24 wherein said initial charge of said first capacitor increases said second off time relative to said first off time.

27. The improvement of claim 24 further including a voltage dropping impedance connected across said switch means, said impedance means providing a charging voltage for said first capacitor.

28. The improvement of claim 24 further including semiconductor switching means connected in controlling relation with said timing means, said semiconductor switching means disabling said timing means during said on time.

29. In a flasher circuit for pulsing a load circuit from a source of electrical energy including control circuit means interconnecting the source of electrical energy and the load circuit including switch means having an open and closed position, and a timing circuit connected in controlling relation with said switch means for opening and closing said switch means in a preselected timed operation, the timing circuit comprising an output control circuit including a switching element, a cross-coupling network controlling said switching element, a capacitor connected to said switching element, and a charging circuit and a discharge circuit for said capacitor, said output control circuit including first timing means for establishing a first off delay time for the flasher circuit, an on delay and a second off delay, said first off delay being substantially shorter than said second off delay.

30. The invention of claim 29 wherein said output control circuit includes a normally conducting transistor and a normally nonconducting transistor, and a first capacitor connected between the base circuit of one of said transistors, said capacitor initially having a substantially zero charge thereon when the load circuit is open circuited.

UNITED STATES PATENT OFFICE
CERTIFICATE OF CORRECTION

Patent No. 3,576,444     Dated April 27, 1971

Inventor(s) Gordon A. Roberts

It is certified that error appears in the above-identified patent and that said Letters Patent are hereby corrected as shown below:

Column 1, line 5 "ton" should be -- to --. Column 1, line 22 insert -- It is another object of the present invention to provide a flasher circuit having improved lamp outage indicator characteristics. --. Column 3, line 5, "be" should be -- by --. Column 4, line 18 delete "of multivibrator type" and insert -- or 136 --. Column 7, line 60 delete first "remains".
Column 9, line 22 "of" should be --or--.

Signed and sealed this 16th day of November 1971.

(SEAL)
Attest:

EDWARD M. FLETCHER, JR.
Attesting Officer

ROBERT GOTTSCHALK
Acting Commissioner of Pate